United States Patent [19]

Okubo et al.

[11] 4,010,088

[45] Mar. 1, 1977

[54] PROCESS FOR PREPARING HIGHLY-CURED TRANSPARENT RESIN MOLDED PRODUCTS

[75] Inventors: Hiroshi Okubo; Masamichi Kato; Akihiko Ito, all of Takasaki, Japan

[73] Assignee: Japan Atomic Energy Research Institute, Tokyo, Japan

[22] Filed: June 11, 1975

[21] Appl. No.: 586,026

Related U.S. Application Data

[63] Continuation-in-part of Ser. No. 413,870, Nov. 8, 1973, abandoned.

[30] Foreign Application Priority Data

Nov. 14, 1972 Japan .............................. 47-113499

[52] U.S. Cl. ..................... 204/159.24; 204/159.23
[51] Int. Cl.$^2$ ........................................... C08F 2/46
[58] Field of Search ......... 260/88.3 A; 204/159.11, 204/159.22, 159.23, 159.24

[56] References Cited

UNITED STATES PATENTS

| | | | |
|---|---|---|---|
| 2,556,075 | 6/1951 | Erickson | 260/88.3 A |
| 2,580,901 | 1/1952 | Erickson | 260/88.3 A |
| 3,331,761 | 7/1967 | Mao | 204/159.23 |
| 3,359,129 | 12/1967 | Mao | 204/159.23 |
| 3,450,615 | 6/1969 | Eldred | 204/159.23 |
| 3,785,849 | 1/1974 | Parker | 204/159.22 |
| 3,840,448 | 10/1974 | Osborn | 204/159.23 |
| 3,885,060 | 5/1975 | Hirai | 204/159.22 |

*Primary Examiner*—Paul R. Michl
*Attorney, Agent, or Firm*—Stevens, Davis, Miller & Mosher

[57] ABSTRACT

A process for the production of molded product composed of transparent resin having highly cured cross-linked structure comprises the following three steps:

1. the step incorporating a ring-opening and cross-linking catalyst in the initial monomer composition, followed by vinyl-polymerizing the initial monomer composition in a mold into a vinyl polymer at 90% or more conversion by irradiating said composition with an ionizing radiation at such a low temperature that said catalyst is not decomposed,
2. the step molding the vinyl polymer thus obtained into the desired shape, and
3. the step heating the molded product at a temperature of from about 50° C to about 200° C to highly-cure the molded polymer product by the introduction of cross-linking.

9 Claims, No Drawings

PROCESS FOR PREPARING HIGHLY-CURED TRANSPARENT RESIN MOLDED PRODUCTS

CROSS-REFERENCE TO RELATED APPLICATIONS

The present application is a continuation-in-part of U.S. Application Ser. No. 413,870, filed Nov. 8, 1973, and now abandoned.

BACKGROUND OF THE INVENTION

1. Field of the Invention

This invention relates to a process for the production of molded products composed of transparent resin having highly cured cross-linked structure and therefore having superior heat resistance as well as superior hardness. More particularly, the invention relates to a of from process for the production of molded products composed of transparent resin as mentioned above, which comprises incorporating a ring opening catalyst in an initial composition containing at least one glycidyl ester of containing at least one glycidyl ester and at least one other monomer to be polymerized at a low temperature, and polymerizing the initial monomer composition in a mold by irradiating the initial composition with an ionizing radiation at a low temperature to provide a polymer or copolymer in the form of plate, pipe or the like, and molding the resulting polymer or copolymer into a desired shape by means of compression molding, transfer molding or the like, and then curing the molded polymer or copolymer through the introduction of cross-linking by heating.

2. Description of the Prior Art

Up to this time, various methods have been tried to improve heat resistance of polymers by the introduction of cross-linking.. One example is a process in which polyethylene is irradiated with a radiation to introduce cross-linking therein. Another is a process for preparing a transparent resin by polymerizing methyl methacrylate, in which process ethylene dimethacrylate is used as a cross-linking agent in said methyl methacrylate to be polymerized so as to provide a cross-linked polymer having improved heat resistance. Instead of said ethylene dimethacrylate, various other polyfunctional monomers of similar type can also be used for the same purpose.

In general, a process for obtaining a polymeric molded product by two step molding method comprises the following. That is, the first step comprises polymerizing a monomer to be polymerized in a mold to provide a polymer in th form of plate, pipe or the like. The second step comprises remolding the resulting polymer into a desired shape. Therefore, in order to achieve the above propose, the polymer obtained in the first step must have thermoplasticity so as to enable the polymer obtained in the first step to be molded into the desired shape.

However, when polymerizing and cross-linking of a monomer to be polymerized are effected at the same time, the resulting polymer is hard and fragile due to the introduced cross-linked structure. In other words, the resulting polymer having cross-linkages by the glycidyl group cannot be molded into a desired shape, because it has losting its thermoplasticity.

Another known process is that in which glycidyl methacrylate is copolymerized with styrene, methyl methacrylate or the like followed by making a solution of the vinyl polymer thus obtained, to which phosphoric acid, amine or the like is added as a catalyst to bring about ring opening and cross-linking of glycidyl groups in subsequent polymerization ("High Polymer Chemistry", 17187 (1960); "J. Applied Polymer Sci", 5 58 (1961), etc.).

The other known prior art process is that in which glycidyl methacrylate polymers are cross-linked in the presence of a cyclic ether such as propylene oxide, tetrahydrofuran and the like, ring opening-graft polymerization of said cyclic ethers on said glycidyl methacrylate polymer being carried out.

However, none of such conventional curing processes is satisfactory to provide an advantageous process for the production of highly cured transparent resin molded products by the introduction of cross-linking. The reason is that, in order to uniformly disperse a cross-linking-ring opening catalyst into the polymer, in such prior art curing processes, polymers to be cured must be made into a solution or a finely dispersed emulsion thereof before they are cured by the introduction of cross-links. A transparent resin in the solid state cannot be obtained from the solution or emulsion of polymer, or the finely divided polymer, because on polymerizing the same, foam or the finely divided polymers are always present in the resulting molded polymer. Therefore, in the prior art there has been no advantageous method for obtaining thermoplastic polymers of glycidyl methacrylate or the like which are cured by the subsequent heat treatment.

In U.S.A. Pat. No. 2,580,901 dated Jan. 1, 1952, a copolymer of glycidyl acrylate and methacrylate and other monomer is described. However, the Patent does not disclose a process for producing a molded product composed of transparent resin having highly cured cross-linked structure which comprises vinyl-polymerizing the glycidyl ester and other monomer by means of an ionizing radiation so as not to cause cross-linking of the resulting polymer, and molding the vinyl polymer thus obtained into the desired shape, and heating the molded product to cause the cross-linking of the polymer.

In general, molded products formed from transparent resin having uniform optical properties have been prepared by the process comprising the first step polymerizing monomers to be polymerized in a mold to form a sheet or tube of polymer and the second step compression-molding or transfer-molding the sheet or tube thus obtained into a desired shape. Molded polymer having high strength and very high molecular weight has also been prepared by said process. When molded products composed the cross-linked polymer are to be prepared according to such process, a ring-opening and cross-linking catalyst must be incorporated in the initial monomer composition to be polymerized before polymerization of the monomers is carried out. If the catalyst is added after polymerizations, satisfactorily uniform dispersion thereof cannot be obtained, because the monomer has been polymerized at a conversion ratio of 90% or more after polymerizing the monomer in the mold, namely after cast molding of the monomer. It should be noted, however, that if such cross-linking catalyst is incorporated in initial monomer compositions before cast molding is carried out according to the conventional process in which a conventional radical inititator is added to said initial monomer compositions for initiating vinyl polymerization, the cross-linking catalyst will also be activated on heating the polymerization system to polymerizing temperatures, whereby the activated catalyst results in effecting the cross-linking reaction in the resulting polymer. Because the cross-linked polymer no longer has the thermoplasticity, it is impossible to mold the cross-linked polymer into end product having a desired shape.

SUMMARY OF THE INVENTION

If a process is provided by which transparent resin molded products having satisfactory thermoplasticity are obtained before they are highly cured by cross-linking without losing uniform optical properties, it will be a great advantage to those in the art.

Accordingly, one object of this invention is to provide a process for the production of highly cured transparent resin molded products having superior heat resistance as well as superior hardness and uniform optical properties, in which process vinyl polymers are prepared in the first step having thermoplasticity sufficient to give any desired shape by the subsequent treatments such as compression molding and the like, and then the formed resins are highly cured on heating in the curing step with the aid of a ring-opening and cross-linking catalyst which has been incorporated in the initial compositions and is activated not in the first or polymerizing step but in the following curing step.

Another object of this invention is to provide highly-cured transparent resin molded products having superior heat resistance as well as superior hardness and uniform optical properties which may be obtained by the process of the present invention as mentioned above.

The present inventors have accomplished the present invention after having made many experiments and studies to find out how they could surpress, in the first cast molding polymerization step, the activation of a ring-opening and cross-linking catalyst incorporated in an initial monomer composition and yet fully activate the catalyst in the subsequent curing step to provide a highly cured cross-linked polymer product.

DETAILED EXPLANATION OF THE INVENTION

The above and other objects of the present invention can be attained by the process of the present invention which comprises:

1. incorporating a ring-opening and cross-linking catalyst in an initial monomer composition comprising (a) from about 1% to 100% by weight of a glycidyl ester selected from the group consisting of glycidyl methacrylate, glycidyl acrylate and a mixture thereof and (b) from 0% to about 99% by weight of one or more other vinyl monomers at temperatures within the range of from about −50° C to room temperature;

2. vinyl-polymerizing the initial monomer composition thus prepared in a mold at 90% or more conversion ratio by irradiating said composition with an ionizing radiation at a temperature within the range of from about −50° C to room temperature;

3. molding the vinyl polymer thus obtained into the desired shape; and 4. heating the molded product at a temperature of from about 50° C to about 200° C for several minutes to tens of hours to highly-cure the molded polymer product by the introduction of cross-linking.

The features of the present invention are as follows:

a. In the step (2), since vinyl polymerization of the monomer is effected at a low temperature by means of irradiation, the cross-linking catalyst is not activated. Therefore, the cross-linking reaction by the glycidyl group is not effected, but only vinyl-polymerization of the monomer is selctively effected. Particularly, "ionizing radiation" is more advantageous than "conventional heating method"; since the radiation can polymerize the monomer more quickly at a lower temperature than the heating method, there is no chance for the cross-linking reaction to occur.

b. Since the cross-linking reaction did not occur in the polymer in the form of plate, pipe or the like obtained in step (1), said polymer has thermoplasticity. As a result, said polymer can be remolded into a desired shape.

c. Since the end polymer is formed by remolding the cast-polymerized solid polymer made from the monomer (s) to be polymerized, it is transparent. If the end polymer is formed by molding a solution or emulsion of the polymer made without any ring-opening catalyst, it is not optically uniform as mentioned above. As used herein, the term "a ring-opening catalyst" or "a ring-opening and cross-linking catalyst" means a catalyst which acts, when activated, the ring moieties of monomer or prepolymer to open the ring for bringing about cross-linking.

In other words, the present invention comprises: a first step in which glycidyl ester or a mixture of said ester and another vinyl monomer is polymerized or copolymerized into a vinyl polymer by irradiating the polymerizing system with an ionizing radiation at low temperatures in the presence of a ring-opening and cross-linking catalyst which has been incorporated in the initial monomer composition at low temperatures; a second step in which the vinyl polymer thus obtained is molded into any desired shape while it retains good plasticity by means of heating, compression molding, cutting and the like; and a third step in which the molded polymer product is cured by cross-linking introduced therein on heating. In one case, heat provided for molding in the second step will be satisfactory for the curing reaction in the last step, but in another case, additional heat will be required for said curing. As used herein, "glycidyl ester" means glycidyl methacrylate, glycidyl acrylate or a mixture thereof. Similarly, "initial monomer composition" as used herein means a monomer or monomers of said glycidyl ester only or a mixture thereof with one or more other vinyl monomers.

It should be noted that a process which comprises cast-molding an initial monomer composition without incorporating said ring-opening and cross-linking catalyst in the initial monomer composition and then incorporating the catalyst into the cast-molded resin and then curing the molded resin by the introduction of cross-linkings does not give a satisfactory result, because the catalyst is present in only the external surface of the molded resin, and therefore, the cross-linkings are not introduced throughout the end product.

The process of the present invention as mentioned above cna be applied either to the homopolymerization of glycidyl ester or to the copolymerization of glycidyl ester with one or more other vinyl monomers.

In case glycidyl ester is to be copolymerized with one or more other vinyl monomers, glycidyl ester can be used in an amount of about 1% by weight or more, and preferably in an amount of about 5% by weight or more based on the total weight of an initial monomer composition.

Vinyl monomers which can be employed for preparing said initial monomer composition include those which have one ethylenically unsaturated double bond in the monomer molecule such as: methacrylic and acylic esters such as, for example, methyl methacrylate, methyl acrylate, ethyl methacrylate, ethyl acrylate, hydroxyethyl methacrylate, hydroxyethyl acrylate, diallylaminoethyl methacrylate, diallylaminoethyl acrylate, butyl metahcrylate, butyl acrylate, isobutyl methacrylate, isobutyl acrylate, stearyl methacrylate, stearyl acrylate, lauryl methacrylate, lauryl acylate, tridecyl methacrylate, tridecyl acrylate, cylohexyl methacrylate, cyclohexylacrylate, 2,3-dibromopropyl methacrylate, 2,3-dibromopropyl acrylate, phenyl methacrylate, phenyl acrylate, tribromophenyl methacrylate, tribromophenyl acrylate, 2-methoxyethyl methacrylate, 2-methoxyethyl acrylate, 2-ethoxyethyl methacrylate, 2-ethoxyethyl acrylate, 2-butoxyethyl methacrylate, 2-butoxyethyl acrylate, tetrahydrofurfuryl methacrylate, tetrahydrofurfuryl acrylate, 1,2-propanediol monomethacrylate, 1,2-propanediol monoacrylate, 1,2-butanediol monomethacrylate, 1,2-butanediol monoacrylate, 1,3-propanediol monomethacrylate, 1,3-propanediol monoacrylate, 1,4-butanediol monomethacrylate, 1,4-butanediol monoacrylate, 1,5-pentanediol methacrylate, 1,5-pentanediol acrylate, 1,6-hexanediol methacrylate, 1,6-hexanediol acrylate, diethylaminoethyl methacrylate, diethylaminoethyl acrylate, methoxytetraethylene glycol methacrylate, methoxytetraethylene glycol acrylate, ethylene glycol monomethacrylate, ethylene glycol monoacrylate, diethylene glycol monomethacrylate, diethylene glycol monoacrylate, triethylene glycol monomethacrylate, triethylene glycol monoacrylate, tetraethylene glycol monomethacrylate, tetraethylene glycol monoacrylate, glycerol monomethacrylate, glycerol monoacrylate, and the like; vinyl acetate; vinyl chloride; vinylidene chloride; vinyl toluene; styrene; $\alpha$-methyl styrene; acrylonitrile; methyl isopropenyl ketone; diacetone acrylamide; maleic anhydride; methacrylic acid; acrylic acid; and the like.

By the term "glycidyl ester" means a mixture of glycidyl methacrylate and glycidyl acrylate in arbitrary proportions. And, in case a mixture of said two glycidyl esters is to be copolymerized with one or more other vinyl monomers, the mixture of glycidyl esters in arbitrary proportions can be used in an amount of about 1% by weight or more, preferably about 5% by weight or more based on the total weight of the initial monomer composition. Prepolymer of said monomer or monomers, and a mixture of such prepolymer with monomer or monomers can also be used as said initial monomer composition. Said prepolymer can be easily prepared by partially polymerizing monomer or monomers according to a conventional polymerization process using initiating means such as radical initiators, radiations, light and the like.

In the first step of the process of the invention, a ring-opening and cross-linking catalyst which allows ring moieties of a glycidyl ester to open and cause cross-linking when it is activated in the later step is incorporated at low temperatures in the initial monomer composition before the composition is polymerized by irradiating it with an ionizing radiation at low temperature. Typical compounds useful as said ring-opening and cross-linking catalyst include (a) Lewis acids selected from the group consisting of $BF_3$, $SnCl_4$, $FeCl_3$, $SbCl_5$, $SnCl_3$, $ZnCl_2$, $TiCl_4$, and the complexes thereof with organic compound selected from group consisting of ethyl ether, methyl ether, ethyl acetate, methyl acetate, ethyl alcohol, methyl alcohol or propyl alcohol; and (b) strong Bronsted acids selected from the group consisting of HCl, HBr, HI, $H_2SO_4$, inorganic and organic sulfonic acids; acids such as acrylic acid, methacrylic acid, hydroiodic acid; and the like.

The amounts of said types of catalysts to be incorporated in the initial monomer compositions are within the range of from about 0.11% to about 1% by weight based on the amount of glycidyl ester in the initial monomer compositions.

In case the above types of catalysts are employed, they are added to the initial monomer compositions at temperatures within the range of from about $-50°$ C to about $10°$ C, temperatures within the range of from $-30°$ C to $0°$ C being preferred.

Useful catalysts other than said Lewis acids and strong Bronsted acids include amines such as trimethyl amine, triethyl amine and the like as well as organic carboxylic acids such as acrylic acid, methacrylic acid and the like, including anhydride of said organic carboxylic acids such as phthalic anhydride, maleic anhydride and the like.

In case the second types of catalysts such as amines and organic carboxylic acids are employed, they can be incorporated in the initial monomer compositions in amounts within the range of from about 0.01% to about 10% by weight based on the amount of glycidyl ester in the initial monomer compositions.

The temperatures at which the second types of catalysts are added to the initial monomer compositions are within the range of from about $-30°$ C to room temperature.

It is important that the ring-opening and cross-linking catalysts be added to the initial monomer compositions at temperatures within the range as mentioned above. If the temperature is higher than the upper limit of the range, polymerized products will often become opaque or the products will lack optical uniformity. On the contrary, if the temperature is below the lower limit of the range, crystallization will occur in the initial monomer compositions or the compositions will often become too viscous.

Whichever type of catalyst is used, it must be uniformly dispersed in the initial monomer composition by sufficient mixing.

Initial monomer compositions thus prepared are subsequently polymerized into vinyl polymers at 90% or more conversion through selective vinyl-polymerization by irradiating the compositions with an ionizing radiation at temperatures within th range of from about $-50°$ C to room temperature, preferably from $-30°$ C to room temperature. Said polymerization can be preferably carried out at almost the same or near temperatures at which the ring-opening and cross-linking catalysts have been added to the initial monomer compositions. Accordingly, in case the first types of catalysts are employed, the vinyl-polymerization can be conveniently carried out at temperatures within the range of from about $-50°$ C to about $10°$ C preferably from $-30°$ C, and in case the second types of catalysts are employed, the vinyl-polmerization can be conveniently carried out at temperatures within the range of from about $-50°$ C to room temperature, preferably from $-30°$ C to room temperature. It should be noted, however, that in both cases, the vinyl-polymerization can be carried out at temperatures within the range of from about $-50°$ C to room temperature, if necessary.

In the practice of the present invention, any type of ionizing radiation which can ionize materials can be used. Typical ionizing radiations include $\beta$-rays, $\gamma$-rays, $\alpha$-rays an electron beam, X-rays, a neutron beam and the like. These ionizing radiations are generally used at a dose rate of from about $10^3$ to about $10^6$ R/hr (Roentgens/hour) for a total dose of from about $10^5$ to about $10^7$ R.

Total doses of light to be used in said polymerization depend on the scale of apparatus used, desired polymerization rate and the like.

The vinyl polymerization of the initial monomer composition in the present invention is preferably carried out in an inert atmosphere containing little or no oxygen gas.

The vinyl polymers thus obtained still possess sufficient thermoplasticity to be molded into any desired shape without difficulty by the molding treatment in the subsequent step. This fact clearly shows that the ring-opening and cross-linking catalyst incorporated in the initial monomer composition has not been activated during the first, vinyl-polymerization step which has been carried out at low temperature by means of an ionizing radiation.

Then, in the second step, the vinyl polymers thus obtained are molded into any desired shape by the variety of means such as compression molding, transfer molding and the like, generally, after heating them at first.

When, in the third step, the molded vinyl polymers are heated at about 50° C to about 200° C for several minutes to several hours, the vinyl polymers are highly cured by the introduced cross-linking to produce highly cured transparent resin molded products of the desired shape, having superior heat resistance as well as superior hardness.

In some cases, the heat provided to mold the vinyl polymers into some desired shape may be sufficient for the curing purpose in the third step. But, additional heat charge is often required in the third step to accomplish satisfactory curing of the formed resin products. As already mentioned, the molded resin products are heat-treated at a temperature within the range of from (about 50° C to about 200° C) for several minutes to tens of hours to provide fully cured resin products.

The curing reaction in the third step is, of course, carried out by the aid of the activated ring-opening and cross-linking catalyst which has been incorporated in the initial monomer composition. It should be noted that the catalyst is not activated in the first, or vinyl-polymerization step, but activated at first in the third, or curing, step according to the process of the present invention.

After heat treatment in the third step, vinyl polymers substantially completely lose their thermoplasticity as a result of the introduction of cross-linking, and hardness thereof increases remarkably.

The increase in hardness of the polymer products can be known by comparing the surface hardness of the cured products with that of the uncured products. In the following examples, the surface hardness is exhibited in terms of 'Pencil Hardness'.

Additionally, when vinyl monomers such as unsaturated carboxylic acids containing an ethylenically unsaturated double bond in their molecule, or unsaturated amines containing an ethylenically unsaturated double bond in their molecule are used, in the practice of the present invention, to make an initial monomer composition by mixing them with glycidyl ester, no particular catalysts are required to add to said composition, because carboxylic or amino group contained in the molecule of said vinyl monomers may act as a ring-opening and cross-linking catalyst.

Further, coloring agents, fillers and the like can also be added to the initial monomer composition in the practice of the present invention.

The invention is further illustrated by the following examples of preferred embodiments thereof, although it will be understood that these examples are included merely for purposes of illustration and are not intended to limit the scope of the invention unless otherwise specifically indicated.

EXAMPLE 1

0.05 parts by weight of $BF_3OEt_2$ was added to 100 parts by weight of glycidyl methacrylate at 0.° C, and the mixture was poured into a stainless steel-mold (that is, a mold consisting of two buffed stainless steel-sheets each 5 mm thick having therebetween a silicon rubber gasket 5 mm thick, both stainless steel-sheets being fixed to the interposing gasket with a setscrew pressing against each sheet) which had been previously cooled to 0° C. Then, the mixture was polymerized by irradiating it with $\gamma$-ray from $^{60}$Co at a dose rate of 0.5 R/hr for 2 hours at 0° C. The resin sheet thus obtained had a surface hardness of 3H in terms of Pencil Hardness. Then, the resin sheet was heated in an air bath at 120° C for 3 hours. The modified surface hardness of the resin sheet thus treated was 7H in terms of Pencil Hardness. The resin sheet showed good thermoplasticity at the beginning of heating, but it gradually lost thermoplasticity as the curing reaction proceeded, accompanying the increase of the surface hardness. But, the transparency of the resin was not lost throughout the process.

The same procedures were repeated except that no $BF_3OEt_2$ was incorporated in the glycidyl methacrylate. In this latter case, the surface hardness of the resin sheet after heat treatment for curing was not changed as compared with that before said heat treatment. And more, in the latter case, the resin sheet was substantially thermoplastic even after sufficient period of said heat treatment, which positively showed that the resin sheet could not be fully cured by the heat treatment.

EXAMPLE 2

According to the procedures as mentioned in Example 1, initial monomer compositions consisting essentially of 50 parts by weight of glycidyl methacrylate, 50 parts by weight of methyl methacrylate and $BF_3OEt_2$ in amounts as recited in the following Table I were prepared, $BF_3OEt_2$ being incorporated in said compositions at 0° C. Then, each composition was polymerized by irradiating it with $\gamma$-rays from $^{60}$Co at a dose rate of 1 M R/hr for a total dose as recited in Table I at 0° C. The resin sheet thus obtained was then heated in an electric heating bath at 60° C for a period as recited in Table I. The surface hardness of each resin sheet thus treated is shown in Table I.

All resin sheets obtained in this example were transparent.

In an additional experiment, the resin sheet of No. 2 in Table I was, after irradiation had been completed, formed into the shape of a watchglass by compression molding at 130° C followed by heating this at 60° C for 16 hours. No deformation was observed even when the resin sheet thus treated was heated to 130° C.

Table I

| No. | Amounts of BF$_3$OEt$_2$ added (parts by weight) | Total dose (MR) | just after irradiation | Surface hardness of each resin sheet (in Pencil Hardness) after heat treatment 60° C, 2 hrs | 60° C, 20 hrs |
|---|---|---|---|---|---|
| 1 | 0 | 2.0 | H | H | H |
| 2 | 0.05 | 2.0 | H | 3H | 5H |
| 3 | 0.15 | 1.5 | H | 3H | 5H |
| 4 | 0.15 | 2.0 | H | 4H | 5H |

EXAMPLE 3

Experiments as in Example 2 were carried out by varying combinations of monomers in the initial monomer compositions. 0.15 parts by weight of BF$_3$OEt$_2$ was added at 0° C to each monomer composition as recited in Table II. Then, the monomer composition was polymerized by irradiating it at 0° C with γ-rays from $^{60}$Co source at a dose rate of 1 MR/hr for a total dose as recited in Table II. Each sheet thus obtained was then heated at 100° C for 2 hours before the surface hardness thereof was determined. The result is shown in Table II below in Pencil Hardness.

All resin sheets thus obtained gradually lost their thermoplasticity on heating. After 2 hours of heating at 100° C, the resin sheets showed no more thermoplasticity even when they were heated to higher temperatures. All these resin sheets were transparent.

Table II

| Monomers (parts by weight) | | Total dose (R) | just after irradiation | Surface hardness of each resin sheet (in Pencil Hardness) after heat treatment, 100° C, 2 hrs |
|---|---|---|---|---|
| Methyl methacrylate | (20) | | | |
| Glycidyl methacrylate | (80) | 1.5M | HB | 4H |
| Hydroxyethyl methacrylate | (50) | | | |
| Glycidyl methacrylate | (50) | 1 M | H | 6H |
| Hydroxyethyl methacrylate | (20) | | | |
| Glycidyl methacrylate | (80) | 1 M | HB | 4H |
| Acrylonitrile | (50) | | | |
| Glycidyl methacrylate | (80) | 1 M | 3H | 4H |
| Glycidyl methacrylate | (50) | | | |
| Acrylonitrile | (20) | 1.5M | HB | 3H |
| Glycidyl methacrylate | (80) | | | |

EXAMPLE 4

95 parts by weight of glycidyl methacrylate was mixed with 2 parts by weight glycidyl acrylate, and 3 parts by weight of triethyl amine was added thereto. The mixture thus obtained was polymerized as in Example 1 by irradiating it with γ-rays from $^{60}$Co at room temperature for a total dose of 1 MR. The resin sheet thus obtained had a surface hardness of 3H in Pencil Hardness. When the resin sheet had been heated at 125° C for 3 hours, the surface hardness of the sheet was 7H in Pencil Hardness. But, when the addition of triethyl amine was omitted in the above experiment, the surface hardness of the resin sheet was not improved at all by said heat treatment. All these resin sheets were transparent.

EXAMPLE 5

To various monomer compositions as recited in Table III below, tin tetrachloride in amounts as recited in the same table were added respectively. The initial monomer compositions thus prepared were then polymerized similarly as in Example 1 by irradiating them with γ-rays from $^{60}$Co source for a total dose of 1 MR. The surface hardness of resin sheets thus obtained was determined just after irradiation and after the subsequent heat treatment in an air bath at 80° C for 3 hours. The results are shown in Table III below. All these resin sheets were transparent.

Table III

| Monomers (parts by weight) | | Amounts of SnCl$_4$ added (parts by weight) | Surface hardness of each resin sheet just after irradiation | after heat treatment, 80° C, 3 hrs |
|---|---|---|---|---|
| Glycidyl methacrylate | (100) | 0.06 | HB | 2H |
| Hydroxyethyl methacrylate | ( 20) | | | |
| Glycidyl methacrylate | ( 80) | 0.06 | B | 4H |
| Hydroxyethyl methacrylate | ( 20) | | | |
| Glycidyl methacrylate | ( 80) | 0.11 | B | 4H |
| Hydroxyethyl methacrylate | ( 20) | | | |
| | | 0.22 | HB | 5H |

Table III-continued

| Monomers (parts by weight) | Amounts of SnCl₄ added (parts by weight) | Surface hardness of each resin sheet | |
|---|---|---|---|
| | | just after irradiation | after heat treatment, 80° C, 3 hrs |
| Glycidyl methacrylate (80) | | | |

EXAMPLE 6

To a mixture of 80 parts by weight of glycidyl methacrylate and 20 parts by weight of hydroxyethyl methacrylate, 0.29 parts by weight of hydroiodic acid was added at −30° C to provide an initial monomer composition. Another initial monomer composition was prepared according to the same way as mentioned above except that 0.57 parts, instead of 0.29 parts, by weight of hydroiodic acid was added. Both compositions were then polymerized respectively at about −30° C by irradiating them with γ-rays from $^{60}$Co for a dose of $1 \times 10^6$ R in the same way as mentioned in Example 1. The resin sheets thus obtained had a surface hardness of HB in Pencil Hardness respectively. Then, both sheets were heated in an air bath at 80° C for 3 hours respectively. The surface hardness of both sheets thus treated was increased to 3H respectively in Pencil Hardness.

EXAMPLE 7

A mixture of 80 parts by weight of glycidyl methacrylate and 20 parts by weight of acrylic acid was irradiated with γ-rays from $^{60}$Co at a dose rate of $1 \times 10^6$ R/hr for 1 hour at 10° C to polymerize the mixture into a resin sheet. The resin sheet thus obtained was thermoplastic and had a surface hardness of H in Pencil Hardness. The resin sheet was then heated in an air bath at 150° C for 3 hours. The resin sheet thus treated was not thermoplastic and had an increased surface hardness of 9H in Pencil Hardness.

The above experiment was repeated but using methacrylic acid instead of acrylic acid. Similar results were obtained.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A process for the production of a highly-cured transparent resin formed product, which comprises (1) incorporating a ring-opening and cross-linking catalyst in the initial monomer composition comprising (a) from about 1% to 100% by weight of a glycidyl ester selected from the group consisting of glycidyl methacrylate, glycidyl acrylate and a mixture thereof and (b) from 0% to about 99% by weight of one or more other vinyl monomers at temperatures within the range of from about −50° C to room temperature, followed by vinyl-polymerizing the initial monomer composition thus prepared in a mold into a vinyl polymer at 90% or more conversion by irradiating said composition with an ionizing radiation at temperatures within the range of from about −50° C to room temperature so as not to activate said ring-opening and cross-linking catalyst, (2) remolding the thus obtained vinyl polymer having thermoplasticity into the desired shape and (3) heating the molded product at a temperature of from about 50° C to about 200° C for several minutes to tens of hours to highly-cure the molded polymer product by the introduction of cross-linking.

2. The process as set forth in claim 1 in which said vinyl-polymerization is carried out by using an ionizing radiation at a dose rate of from about $10^3$ to about $10^6$ R/hour for a total dose of from about $10^5$ to about $10^7$ R.

3. The process as set forth in claim 1 in which said ionizing radiation is $^{60}$Co-gramma-rays.

4. The process as set forth in claim 1 in which said ring-opening and cross-linking catalyst is selected from the group consisting of (1) Lewis acids selected from the group consisting of $BF_3$, $FeCl_3$, $SnCl_4$, $SbCl_5$, $ZnCl_2$, $TiCl_4$, and mixtures thereof, and the complexes thereof with an oxygen-containing organic compound selected from group consisting of ethyl ether, methyl ether, ethyl acetate, methyl acetate, ethyl alcohol, methyl alcohol or propyl alcohol; and (2) strong Bronsted acids selected from the group consisting of HCl, HRr, HI, $H_2SO_4$, inorganic sulfonic acid, organic sulfonic acid, and mixture thereof, said catalyst being used in an amount of from about 0.001% to about 1% by weight of glycidyl ester and being incorporated in said initial monomer composition at a temperature within the range of from −50° C to 0° C.

5. The process as set forth in claim 1 in which said ring-opening and cross-linking catalyst is selected from the group consisting of amines, and organic carboxylic acids, said catalyst being used in an amount of from about 0.01% to about 10% by weight of glycidyl ester and being incorporated in said initial monomer composition at a temperature within the range of from −30° C to room temperature.

6. The process as set forth in claim 1 in which said vinyl monomer other than glycidyl ester is selected from the group consisting of methyl methacrylate, methyl acrylate, ethyl methacrylate, hydroxyethyl methacrylate, diethylaminoethyl methacrylate, butyl methacrylate, 1,6-hexanediol monoacrylate, acrylic acid, methacrylic acid, vinyl acetate, styrene, α-methyl styrene, acrylonitrile, vinyl chloride, vinylidene chloride, maleic anhydride or a mixture of two or more of them.

7. The process as set forth in claim 1 in which part or all of said vinyl monomer or monomers other than glycidyl ester is one selected from the group consisting of (1) unsaturated carboxylic acids containing an ethylenically unsaturated double bond in their molecule and (2) unsaturated amines containing an ethylenically unsaturated double bond in their molecule, carboxylic or amino group contained in the molecule of said vinyl monomers being able to act as a ring-opening and cross-linking catalyst, the incorporation of any other such catalyst in the initial monomer composition being omitted.

8. The process as set forth in claim 5, in which said amine is trimethyl amine or triethyl amine.

9. The process as set forth in claim 1 in which said vinyl-polymerization is carried out by using a stainless-steel mold.

* * * * *